J. J. BUKOLT.
MILKING MACHINE.
APPLICATION FILED DEC. 21, 1908.
940,852.
Patented Nov. 23, 1909.
2 SHEETS—SHEET 2.
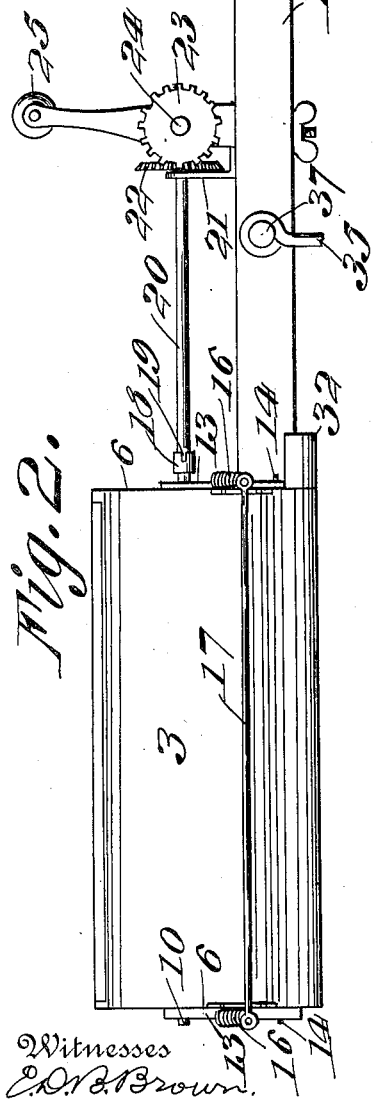
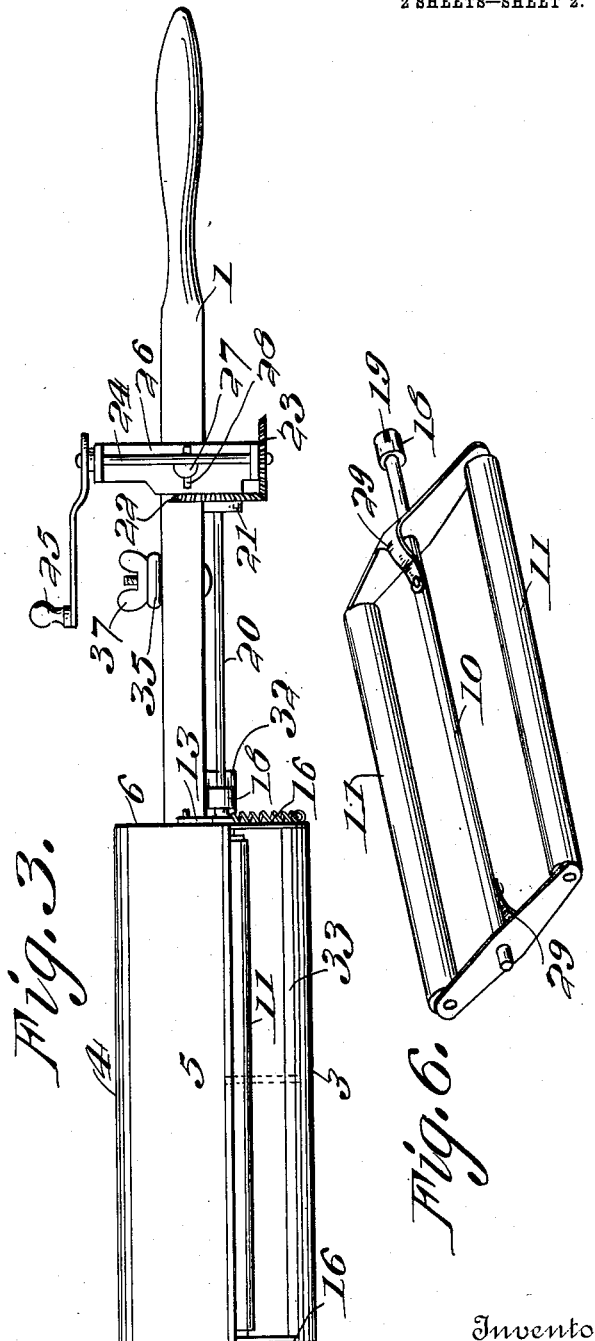
Witnesses
E. D. F. Brown.
C. H. Griesbauer.
Inventor
John J. Bukolt,
by H. B. Willson & Co.
Attorneys

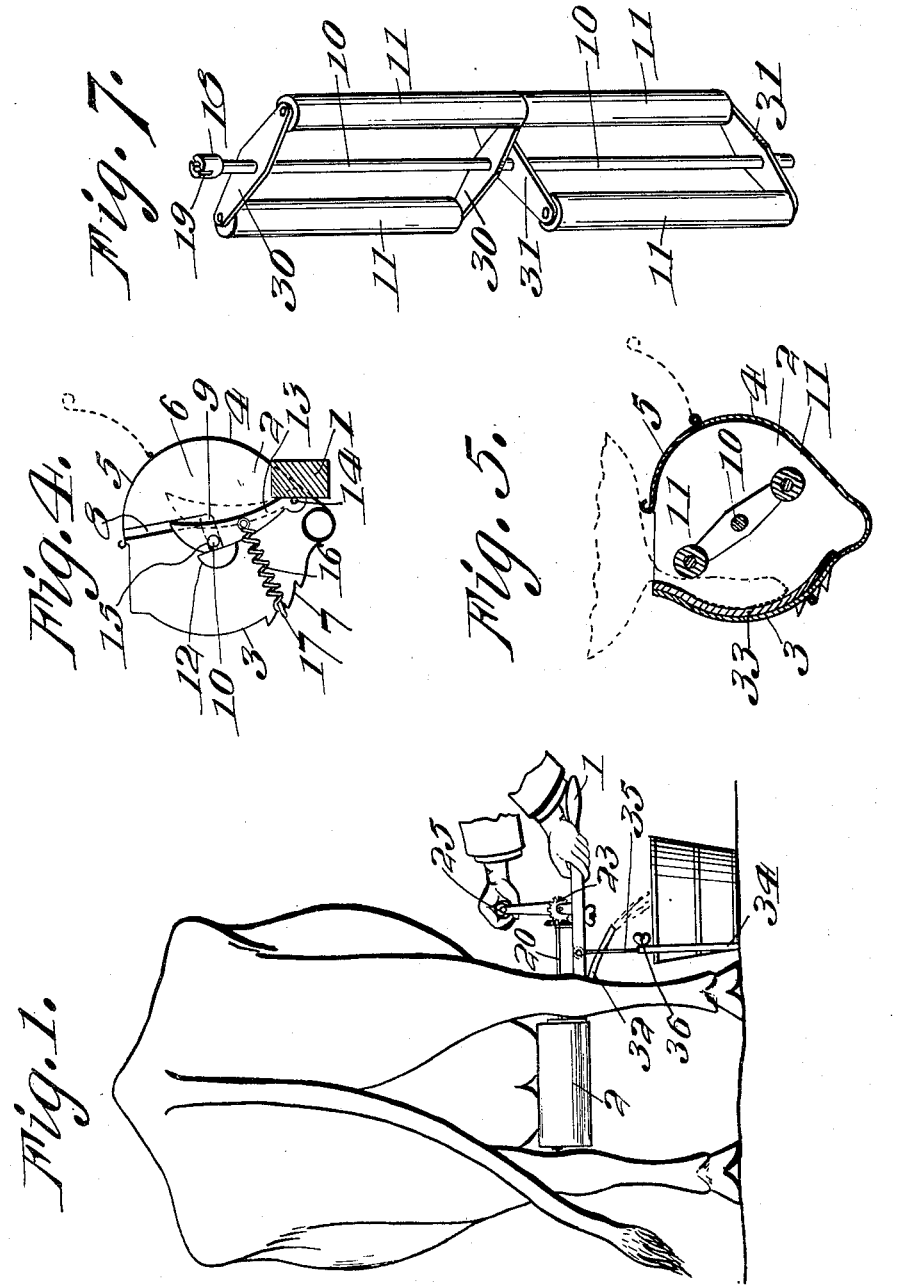

UNITED STATES PATENT OFFICE.

JOHN JOSEPH BUKOLT, OF STEVENS POINT, WISCONSIN.

MILKING-MACHINE.

940,852.  Specification of Letters Patent.  Patented Nov. 23, 1909.

Application filed December 21, 1908. Serial No. 468,544.

*To all whom it may concern:*

Be it known that I, JOHN J. BUKOLT, a citizen of the United States, residing at Stevens Point in the county of Portage and State of Wisconsin, have invented certain new and useful Improvements in Milking-Machines; and I do declare the following to be a full, clear, and exact description of the invention, such as will enable others skilled in the art to which it appertains to make and use the same.

My invention relates to milking machines, and particularly to that type known in the art as hand operating machines.

The object of the invention is to provide a machine of this character which may be readily applied, and easily and rapidly operated and which will not annoy or injure the animal.

A further object of the invention is a provision of means whereby an equal tension is maintained upon the teats and whereby such tension may be adjusted for hard or easy milkers, and whereby the machine may be adapted for animals having large or small teats.

A still further object of the invention is a provision of a device of this character which may be readily taken apart so that the working elements of the machine may be effectually cleaned.

A still further object of the invention is the provision of means for supporting the device at any suitable height and for adjusting its position at will.

With these and other objects in view, the invention consists of certain novel features of construction, combination and arrangement of parts, as will be more fully described and particularly pointed out in the appended claims.

In the accompanying drawings, Figure 1 is a view showing application of the device; Fig. 2 is a side elevation of the device; Fig. 3 is a top plan view; Fig. 4 is an end elevation; Fig. 5 is a transverse section through the casing; Fig. 6 is a detail perspective view of one type of roller, and Fig. 7 is a similar view of a modified form.

Referring more especially to the drawings, 1 represents a handle or lever upon which is secured the milking tank or receptacle 2 preferably constructed of sheet metal and provided with sides 3 and 4 the latter of which is provided with a hinged top 5 for a purpose which will be hereinafter described. These sides are connected by end members 6 which have their edges adjacent the sides 3 provided with notches 7 to be hereinafter referred to. The end members are preferably provided with vertical or substantially vertical slots 8 which connect at their end with slots 9 adapted to receive and form a bearing for the shaft 10 of the milking rollers 11. This shaft is held against suitable buffers 12 carried by the end members by bearing elements 13 pivoted at their lower ends 14 to the ends of the casing 6 and provided adjacent their upper ends with notches 15 adapted to receive the shaft 10. Suitable springs 16 are connected to the bearing elements 13 intermediate their engagement with the shaft and their pivotal point so as to draw the bearing elements against the shaft and force the latter into engagement with its limiting buffers. The opposite ends of these springs are connected to a suitable rod 17 which extends from end to end of the casing and projects therebeyond to be attached to the springs, which hold the rod in engagement with the notches 7. It will be seen that by adjusting the rod the tension of the springs may be changed to suit the working end. The end of the shaft 10 projects beyond the end of the casing and is provided with a clutch element or collar 18 notched at 19 to receive a cross pin connected to the operating shaft 20. This operating shaft 20 is mounted in a bearing 21, and is provided at the end opposite from the clutch with a beveled gear 22 adapted to be engaged by a similar gear 23 carried upon the crank shaft 24. This crank shaft together with the gear 22 and the operating handle 25 is mounted upon an adjustable bracket 26 held in adjusted position upon the handle 1 by means of the thumb screw 27 which passes through the handle and through a slot 28 in the bottom of the bracket. By this means it will readily be seen how the shaft 20 may be disconnected from the shaft 10, and it will be seen how the milking rollers may then be disconnected from their bearing elements and removed from the casing through the slots 8.

The milking rollers are preferably arranged as shown in Figs. 6 and 7, in the former of which they are arranged upon brackets 29 carried by the shaft 10 and are preferably constructed of soft rubber. In Fig. 7 brackets 30 and 31 are provided which are arranged at right angles to each other so that the teat on the left hand side of the udder receives a stroke intermediate the resting period of the teat on the right hand side of the udder. In the structure shown in Fig. 6 both teats on the right and left hand sides of the udder are operated simultaneously. A suitable nipple or outlet tube 32 is connected to the bottom of the casing at the inner end and is so constructed that a piece of rubber tubing may be slipped thereover to conduct the milk from the casing to the milking pail. In order that there may be no damage or injury done to the animal, I preferably provide a soft rubber pad 33 which extends the full depth or approximately the full depth of what may be termed the milking side of the casing 3, so that the teat lies against said pad and is pressed thereagainst by the rollers 11 in their travel which it will be seen, conform to the arc on which the side of the casing is made.

In order to support the device in operative position, I preferably provide a standard 34 in which is reciprocally mounted a supporting rod 35 held in adjusted position by a thumb screw 36. This supporting rod is pivotally connected to a thumb bolt 37 which is carried by the handle 1. It will readily be seen how this standard may be substituted for a clamp to be adapted for attachment on the milking pail or substituted for a knee rest which will have the rod 35 mounted adjustably therein.

In operation the device is supported on the standard in properly adjusted position, the forward and rear teats of the udder placed in the casing against the soft rubber pad 33. The handle is then revolved in a right hand direction which turns the shaft 10 through the shaft 20 and the gear 22, in a left hand direction, thus bringing one of the rollers 11 in engagement with the teats and forcing out the milk contained therein. After the roller leaves the teats the interval between the first operation and the succeeding engagement by the second roller permits the teats to fill again, and the operation is thus repeated. It will be noticed that the casing end of the handle should be slightly elevated in practice so that the milk in the trough formed in the bottom of the casing will gravitate to the spout 32 and from thence into the bucket through the customary rubber tube.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is—

1. In a device of the class described, a milking machine, a manipulating handle extending therefrom, and a supporting fulcrum for the machine pivoted to the handle intermediate its length.

2. In a device of the class described, a milking machine, a supporting handle extending therefrom, and an adjustable supporting fulcrum pivoted to the handle intermediate its length.

3. In a device of the class described, a casing, rollers mounted therein, means for rotating said rollers whereby they will intermittently engage and press the teats against the casing, means for removably holding said rollers in the casing, means for limiting the movement of said holding means, adjustable means for normally forcing said holding means into engagement with the limiting means, and means for disconnecting the operating means from the rollers.

4. In a device of the class described, a casing, a shaft journaled in said casing, brackets carried by said shaft, teat engaging rollers carried by the brackets, means to operate said rollers whereby they will alternately engage and press the teats against the casing to positively force out the milk therein, means to disconnect said operating means from the rollers, and means carried by the casing which permits the removal of the rollers therefrom.

5. In a device of the class described, a casing, a shaft journaled therein, oppositely disposed rollers carried by the shaft, means for forcing said rollers into engagement with the teats whereby the latter are pressed against the casing, means to rotate said shaft, means for limiting said forcing means, means permitting the removal of the rollers from the casing and from said forcing means, and means to disengage said operating means from the shaft.

6. In a device of the class described, a casing comprising end and side members, notches formed in said end members and slots formed in said end members, a top carried by one of the side members and adapted to cover the opening of the slots in the end members, a shaft arranged in said slots, brackets carried upon said shaft, rollers revolubly mounted in said brackets on diametrically opposite sides of said shaft, pivoted bearing elements removably connected to said shaft, limiting stops for said shaft, spiral springs for normally forcing said pivoted bearing elements and said shaft into engagement with said stops, connecting means for simultaneously adjusting said springs, an operating shaft removably connected to the first mentioned shaft, a bracket for supporting said operating shaft, a crank shaft and crank carried by said bracket, beveled gears on said operating and crank shafts adapted to mesh with each other, said bracket being slotted, a supporting handle, and means passing through the supporting handle and the slot in the bracket for adjustably securing the same to the supporting handle.

In testimony whereof I have hereunto set my hand in presence of two subscribing witnesses.

JOHN JOSEPH BUKOLT.

Witnesses:
T. L. N. PORT,
R. B. JOHNSON.